(12) United States Patent
Sofia et al.

(10) Patent No.: US 9,575,722 B2
(45) Date of Patent: Feb. 21, 2017

(54) SOFTWARE INTERFACE FOR A SPECIALIZED HARDWARD DEVICE

(71) Applicant: International Business Machines Corporation, Armonk, NY (US)

(72) Inventors: Anthony T. Sofia, Highland, NY (US); Peter B. Yocom, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 429 days.

(21) Appl. No.: 13/803,707

(22) Filed: Mar. 14, 2013

(65) Prior Publication Data
US 2014/0282552 A1 Sep. 18, 2014

(51) Int. Cl.
*G06F 9/48* (2006.01)
*G06F 5/14* (2006.01)
*G06F 9/50* (2006.01)

(52) U.S. Cl.
CPC .............. *G06F 5/14* (2013.01); *G06F 9/4843* (2013.01); *G06F 9/5044* (2013.01); *G06F 2205/126* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 5,717,951 | A | * | 2/1998 | Yabumoto ............ G06F 3/0619 707/999.1 |
| 6,151,316 | A | * | 11/2000 | Crayford et al. ............ 370/356 |
| 8,332,831 | B1 | | 12/2012 | Metzgen |
| 8,522,241 | B1 | * | 8/2013 | Vohra .................... G06F 9/5083 709/201 |
| 2006/0155671 | A1 | * | 7/2006 | Bantz et al. ...................... 707/1 |
| 2009/0012963 | A1 | * | 1/2009 | Johnson et al. ................ 707/10 |
| 2010/0083210 | A1 | | 4/2010 | Megen et al. |
| 2011/0041127 | A1 | * | 2/2011 | Kohlenz ............... G06F 9/4843 718/100 |
| 2012/0079246 | A1 | * | 3/2012 | Breternitz, Jr. ..... G06F 9/30072 712/208 |
| 2012/0131564 | A1 | * | 5/2012 | Das .............................. 717/168 |

OTHER PUBLICATIONS

Altera Corporation; "Chapter 8: Hardware Acceleration and Coprocessing", Embedded Design Handbook; Jul. 2011; pp. 8-1-8-14.

(Continued)

*Primary Examiner* — Umut Onat
(74) *Attorney, Agent, or Firm* — Cantor Colburn LLP; William A. Kinnaman, Jr.

(57) ABSTRACT

Embodiments of the disclosure include systems for performing a data manipulation function. The method includes receiving, by a processor, a request from an application to perform the data manipulation function and based on determining that a specialized hardware device configured to perform the data manipulation function is available, the method includes determining if executing the request on the specialized hardware device is viable. Based on determining that the request is viable to execute on the specialized hardware device, the method includes executing the request on the specialized hardware device.

7 Claims, 7 Drawing Sheets

(56) References Cited

OTHER PUBLICATIONS

Ramanathan et al, "Interfacing Hardware and Software using C++ Class Libraries"; Proceedings of 2000 Conference on Computer Design, 2000; pp. 445-450.
Anthony T. Sofia, et al., "Software Interface for a Specialized Hardware Device," U.S. Appl. No. 14/501,154, filed Sep. 30, 2014.
List of IBM Patents or Patent Applications Treated as Related, (Appendix P), Filed Mar. 29, 2016, 2 pages.

* cited by examiner

SOFTWARE INTERFACE FOR A SPECIALIZED HARDWARE DEVICE

BACKGROUND

The present invention relates to interfaces for hardware devices, and more specifically, to methods and systems for matching a software interface to a specialized hardware device.

Recently, the use of specialized hardware devices for performing processor intensive functions has been increasing. These specialized hardware devices may be used for data manipulation operations, such as data compression, encoding, or the like. These specialized hardware devices, such as data manipulation devices, often have different performance attributes, such as speed and latency, than a general processor performing similar operations in pure software. For example, an increased overhead may be incurred in communicating with a specialized hardware device as compared with a general processor.

In general, in order for the specialized hardware devices to be used by a processor a software interface is required. The software interface allows the processor and applications to utilize the specialized hardware devices to perform processor intensive functions.

SUMMARY

Embodiments include a computer system for performing a data manipulation function. The computer system includes a processor configured to execute a method including receiving, by a processor, a request from an application to perform the data manipulation function and based on determining that a specialized hardware device configured to perform the data manipulation function is available, the method includes determining if executing the request on the specialized hardware device is viable. Based on determining that the request is viable to execute on the specialized hardware device, the method includes executing the request on the specialized hardware device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments, a software interface that is configured to facilitate interaction between a processor and a specialized hardware device is provided. In exemplary embodiments, the software interface permits the specialized hardware device to be transparently integrated into a computer system and to perform processing for existing workloads and applications. In exemplary embodiments, the software interface is configured to abstract all aspects of the operation of the specialized hardware device, which will allow an existing library API to exploit the specialized hardware transparently to the library API. Accordingly, the specialized hardware device can be updated, removed or replaced with software without requiring any changes to the library API. In addition, the software interface may support load balancing across multiple specialized hardware devices and fail-over processing that is transparent to the library API.

Figure 1:
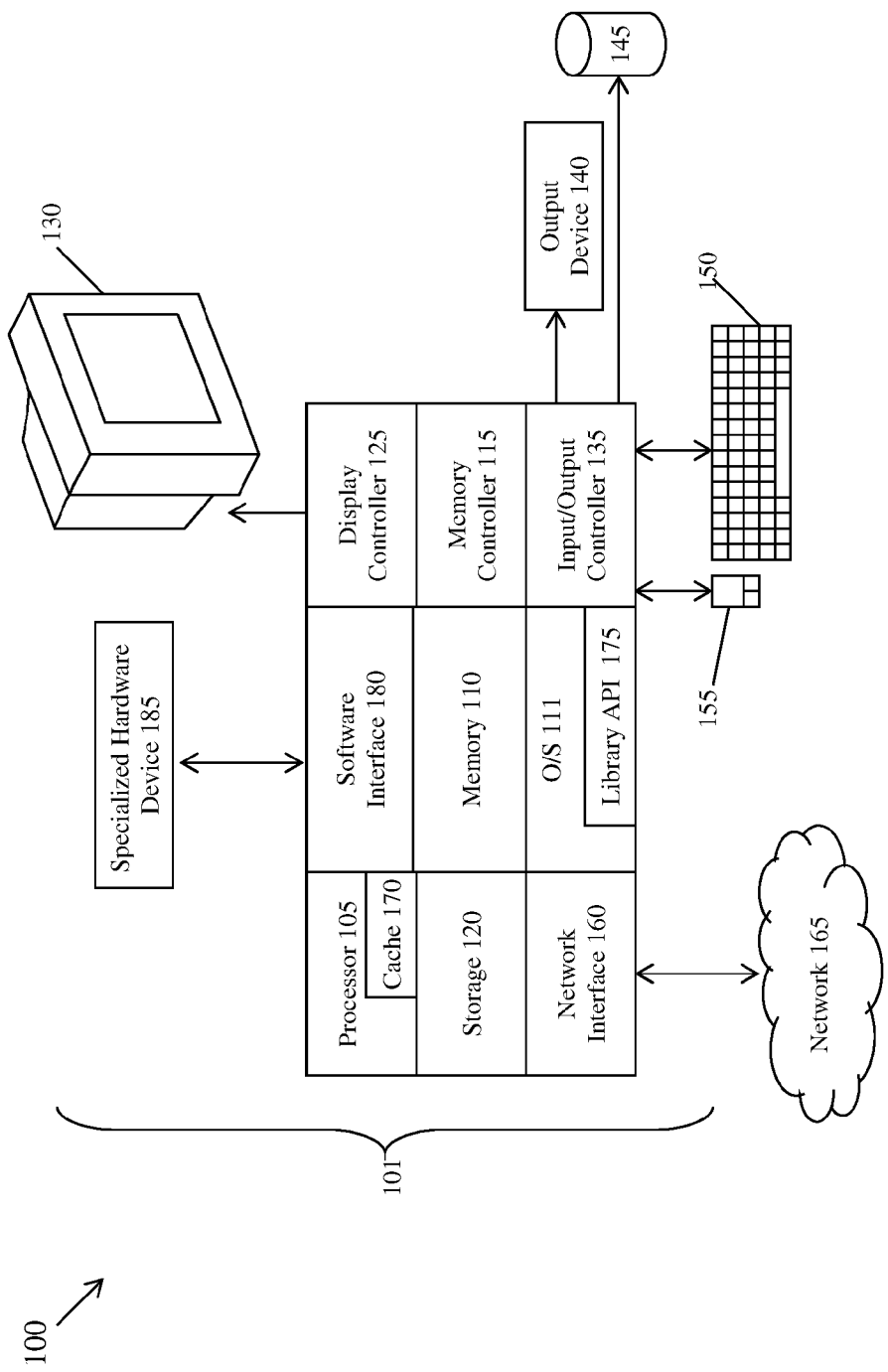
FIG. 1 illustrates a block diagram of a computer system for use in practicing the teachings herein.

FIG. 1 illustrates a block diagram of a computer system 100 for use in practicing the teachings herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. The computer system 100 therefore includes general-purpose computer 101.

In an exemplary embodiment, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing hardware instructions or software, particularly that stored in memory 110 or storage 120. The processor 105 can be any custom made or commercially available processor, a central processing unit (CPU), an auxiliary processor among several processors associated with the computer 101, a semiconductor based microprocessor (in the form of a microchip or chip set), a macro processor, or generally any device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the hardware devices. The BIOS is stored in ROM so that the BIOS can be executed when the computer 101 is activated. When the computer 101 is in operation, the processor 105 is configured to execute instructions stored within the memory 110, to communicate data to and from the memory 110, and to generally control operations of the computer 101 pursuant to the instructions.

In exemplary embodiments, the computer 101 further includes a software interface 180 that is configured to communicate with a specialized hardware device 185. The specialized hardware device 185 is a device configured to perform a data manipulation function, which can be any algorithm that manipulates input data into a defied format of output data. In exemplary embodiments, the data manipulation function may increase or decrease the size of the input data. For example, the data manipulation function may be configured to compress or decompress data. In exemplary embodiments, the operating system 111 includes a library API 175, which is a software library comprising APIs for performing the data manipulation functions provided by the specialized hardware devices 185.

In exemplary embodiments, the library API 175 is configured to determine if a request for a data manipulation function will be executed by a software API or by the specialized hardware device 185. The library API 175 may make this determination based on the size of the data to be manipulated, the availability of the specialized hardware device 185 and characteristics of the specialized hardware device 185. In exemplary embodiments, the availability and characteristics of the specialized hardware device 185 can be provided to the library API 175 by the software interface 180. For example, the software interface 180 may provide the library API 175 with a suggested minimum data size for the use of the specialized hardware device 185 based on the overhead associated with using the specialized hardware device 185.

In exemplary embodiments, the software interface 180 is configured to provide buffering support for data manipulation requests received from and responses sent to the library API 175. In exemplary embodiments, the software interface 180 can also provide fail-over processing in the event of a failure of the specialized hardware device 185.

In exemplary embodiments, the software interface 180 may be configured to determine if data manipulation requests received from the library API 175 are viable to be sent to specialized hardware device 185. The viability of a data manipulation request can be based on determining if the overhead of performing the setup for sending the operation to the specialized hardware devices 185 outweighs the cost of doing the operation itself. If this goal can not be reached it would be more efficient to perform the data manipulation request using the software API equivalent to the specialized hardware device 185. In exemplary embodiments, the software interface 180 provides the library API 175 with a minimum threshold size that represents the lower bound size of viability for a data manipulation request.

In exemplary embodiments, the library API 175 is configured to determine if the specialized hardware device 185 should be used to perform a data manipulation function prior to performing initialization of the specialized hardware device 185. The API library 175 may be configured to allow an application to set the threshold used for deciding between using a software API and the specialized hardware device 185, rather than using the threshold provided by the specialized hardware device 185. For example, the application may determine an appropriate threshold based on application specific behaviors.

In exemplary embodiments, a specialized hardware device 185 can be configured to support processing data in a stream, which may result in multiple requests that need to be tied together. Accordingly, the library API 175 may provide the software interface 180 with a buffer, or other suitable storage, that can be used for saving required state information across multiple requests. In exemplary embodiments, the library API 175 will determine the size of the buffer required by querying the software interface 180.

In exemplary embodiments, to avoid having the library API 175 deal with the complexity of device interaction the software interface 180 will handle management of one or more specialized hardware devices 185. In the event that a specialized hardware device 185 is not available to handle requests, the software interface 180 will attempt the operation on another specialized hardware device 185, if one is available. After determining that there is no specialized hardware device 185 available, or after a predetermined number of failures, the software interface 180 will return an error to the library API 175. In exemplary embodiments, the software interface may provide the ability for the library API 175 to find out if there are specialized hardware devices 185 available. This information can be used by the library API 175 to decide if the hardware device path should be taken and also if the library API 175 wants to perform parallel operations based on the number of available devices.

Figure 2:
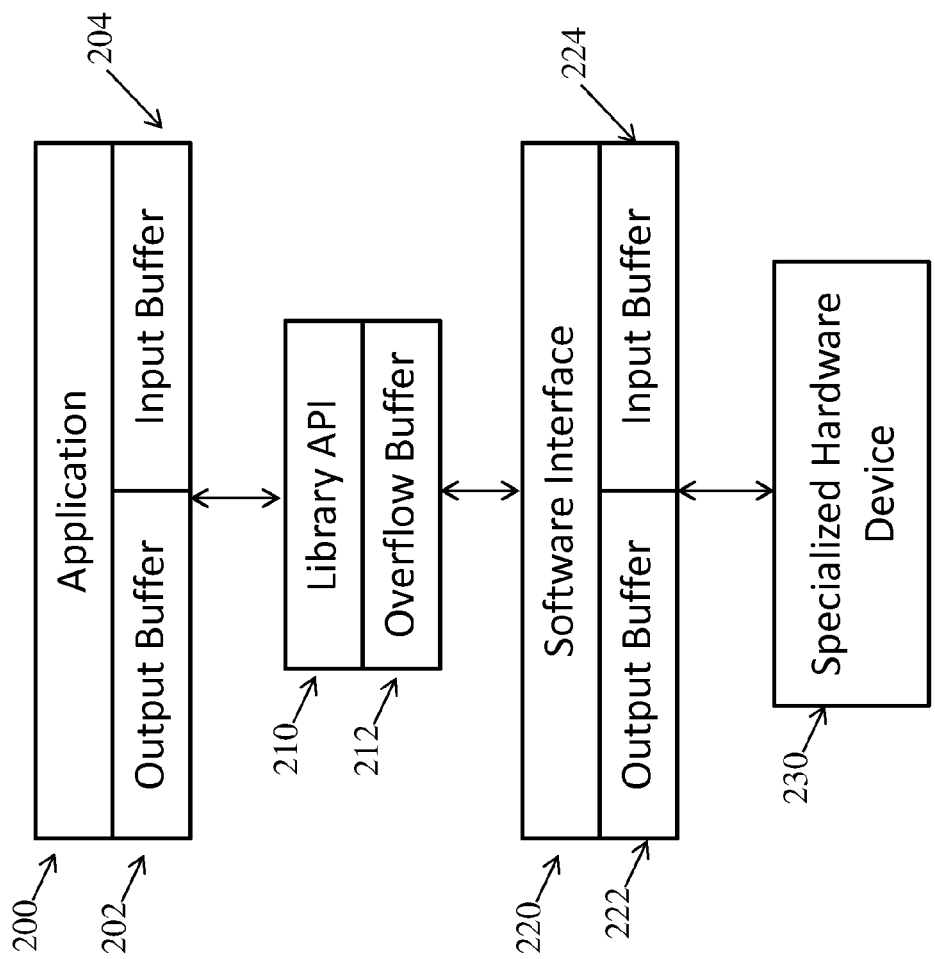
FIG. 2 illustrates a block diagram of a portion of computer system in accordance with an exemplary embodiment.

Referring now to FIG. 2, a block diagram illustrating a portion of a computer system in accordance with an exemplary embodiment is shown. The computer system includes an application 200 in communication with a library API 210. The application 200 utilizes the library API 210 to perform a data manipulation function. The library API 210 in turn utilizes a software interface 220 to interface with a specialized hardware device 230 for executing the data manipulation function. As illustrated, the application 200 includes an application input buffer 204 and an application output buffer 202 that are used to pass data back and forth to the library API 210. In exemplary embodiments, the size of the application input buffer 204 and application output buffer 202 are determined by the application 200. The software interface 220 also includes an input buffer 224 and an output buffer 222 that are used to communicate with the specialized hardware device 230. As illustrated, the library API 210 includes an overflow buffer 212. In exemplary embodiments, the software interface input buffer 224 and software interface output buffer 222 may have various sizes, which and can be assigned to a library API 210 request via a best fit algorithm.

In exemplary embodiments, applications 200 using the library API 210 to perform data manipulation may not have application input buffers 204 and application output buffers 202 that are sized in a way that is optimal for use by the specialized hardware device 230. In addition, the library API 210 includes an overflow buffer 212 that is configured to supplement the application output buffer 204. The overflow buffer 212 is sized to allow for a best fit with the software interface output buffer 222.

In the event an application 200 uses optimally sized buffers then the library API 210 does not need to allocate an overflow buffer 212. In this case, the software interface 220 is responsible for providing feedback to the library API. If no overflow buffer 212 is provided and the application output buffer 202 becomes exhausted then the software interface 220 may request that an overflow buffer 212 be established. In addition the software interface 220 may request that the overflow buffer 212 have a size which would lead to use of the next largest software interface internal buffer size or a size required as a result of the request running to completion. In the event that the overflow buffer 212 already causes the software interface 220 to choose the largest possible internal buffer size then the application 200 may have to limit the amount of input to provides in a single request.

Figure 3:
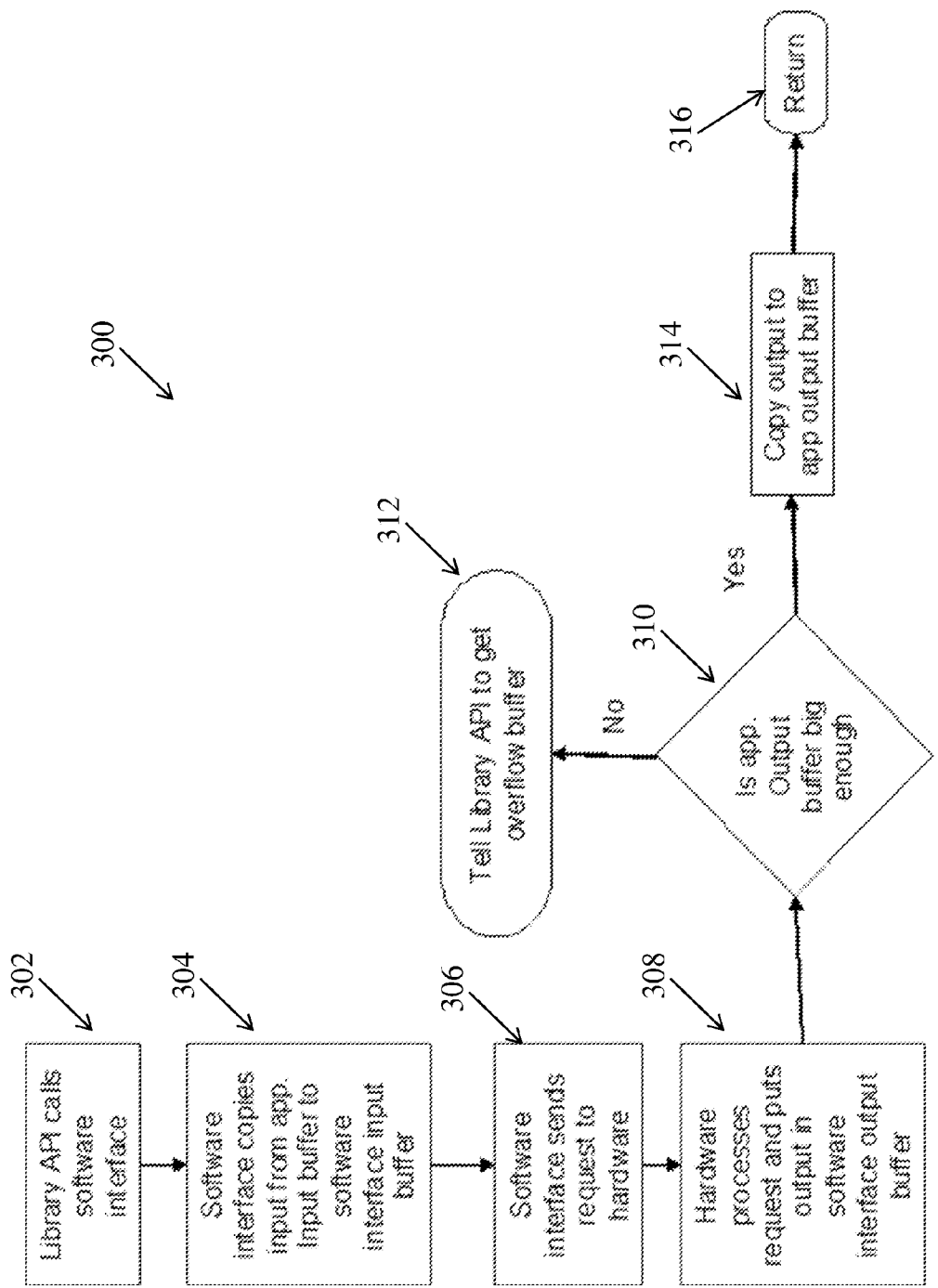
FIG. 3 illustrates a flow diagram illustrating a method for buffer handling when a library API does not have an overflow buffer in accordance with an exemplary embodiment.

Referring now to FIG. 3, a flow diagram illustrating a method 300 for buffer handling when the library API does not have an overflow buffer in accordance with an exemplary embodiment. As illustrated, the method 300 begins at block 302 when the library API calls the software interface. Next, as shown at block 304, the software interface copies input from the application buffer input buffer to the software interface buffer. As shown at block 306, the method 300 includes the software interface sending a request to the specialized hardware device. Next, as shown at block 308, the specialized hardware device processes the request and sends the output to the software interface output buffer. At decision block 310, the method determines if the application output buffer large enough to handle the output of the specialized hardware device. If the application output buffer large is not large enough to handle the output of the specialized hardware device, the method 300 proceeds to block 312 and instructs the library API to get an overflow buffer. Otherwise, the method proceeds to block 314 and copies the output buffer to the application output buffer. Next, the method 300 completes at block 316.

Figure 4A:
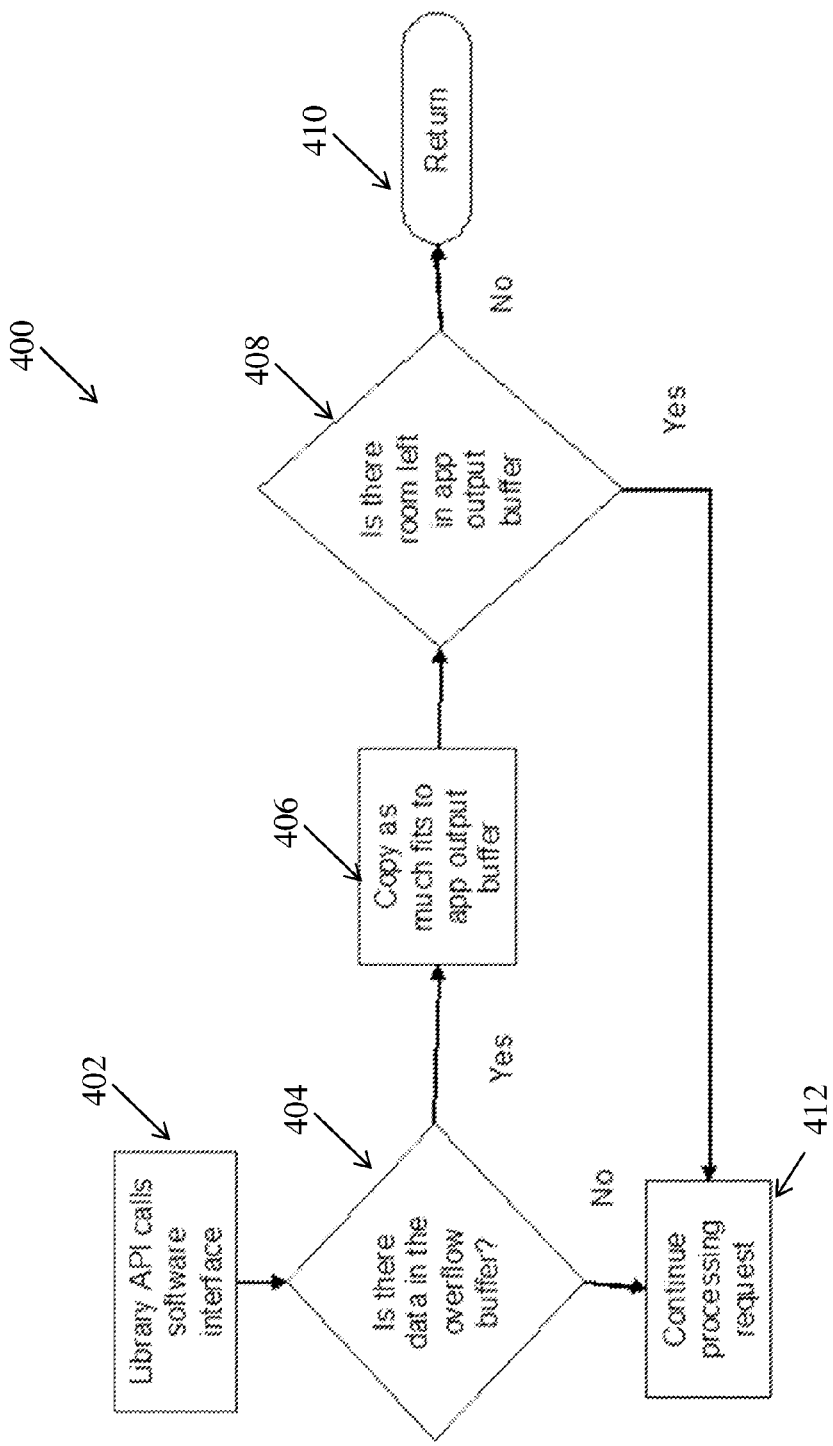
FIG. 4A illustrates a portion of a flow diagram of a method for buffer handling when the library API has an overflow buffer in accordance with an exemplary embodiment.
Figure 4B:
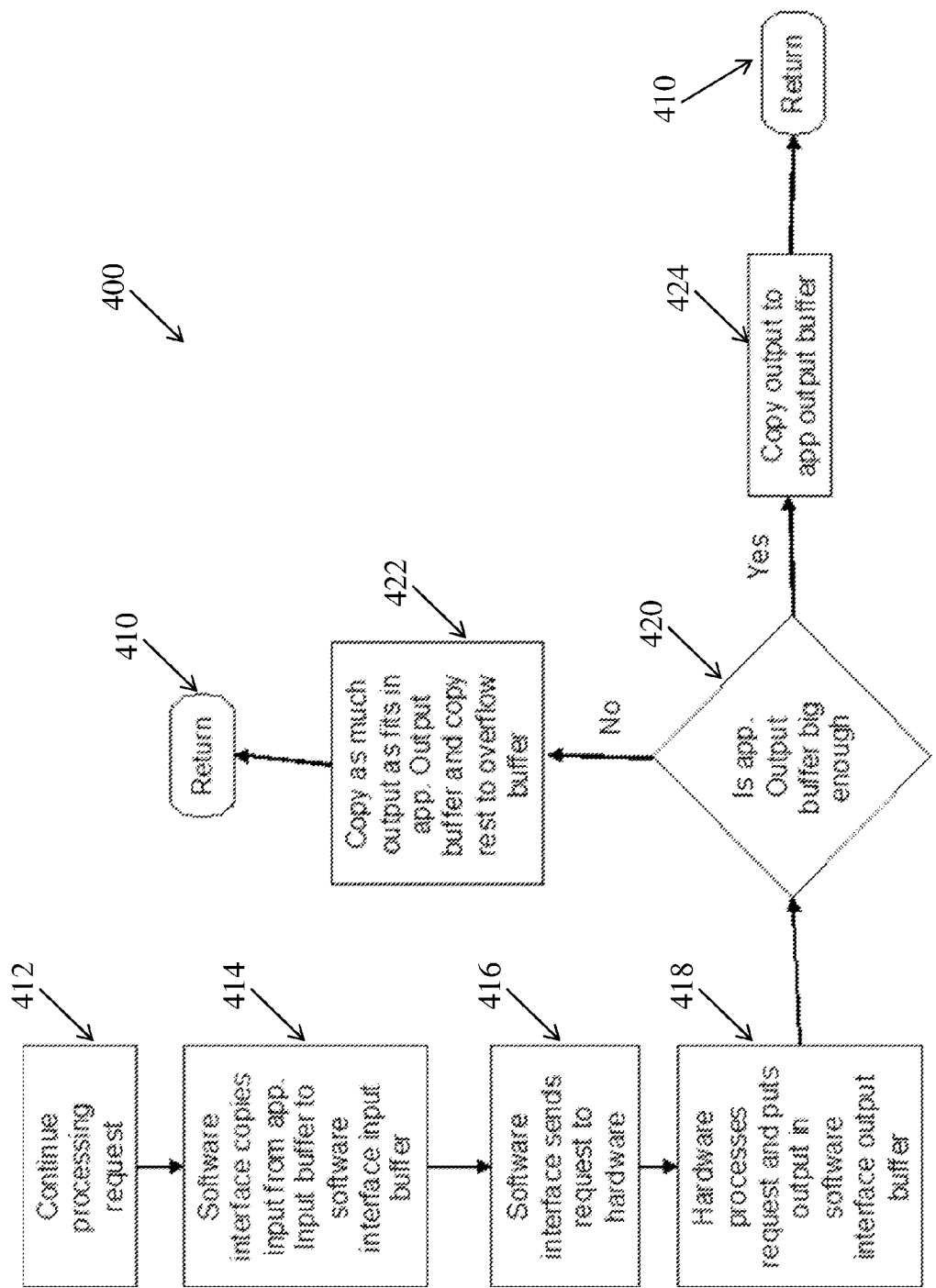
FIG. 4B illustrates a portion of a flow diagram of a method for buffer handling when the library API has an overflow buffer in accordance with an exemplary embodiment.

Referring now to FIGS. 4A and 4B, flow diagrams illustrating a method 400 for buffer handling when the library API has an overflow buffer in accordance with an exemplary embodiment. As illustrated, the method 400 begins at block 402 when the library API calls the software interface. Next, as shown at decision block 404, the method 400 includes determining if there is data in the overflow buffer. If there is data in the overflow buffer, the method proceeds to block 406 and copies as much data from the overflow buffer into the application output buffer as the application output buffer can hold. Otherwise, the method 400 proceeds to block 412 and continues processing the request. As shown at decision block 408, the method 400 includes determining if there is any available space in the application output buffer. If there is not any available space in the application output buffer, the method proceeds to block 410 and concludes. Otherwise, the method 400 proceeds to block 412 and continues processing the request.

Continuing with reference to FIG. 4B, as shown at block 414 the method 400 includes the software interface copying input from the application buffer input buffer to the software interface buffer. As shown at block 416, the method 400 includes the software interface sending a request to the specialized hardware device. Next, as shown at block 418, the specialized hardware device processes the request and sends the output to the software interface output buffer. At decision block 420, the method determines if the application output buffer large enough to handle the output of the specialized hardware device. If the application output buffer large is not large enough to handle the output of the specialized hardware device, the method 400 proceeds to block 422 and copies as much output data as can fit into the application output buffer and copies the remaining output data to the overflow buffer. Otherwise, the method proceeds to block 424 and copies the output to the application output buffer. Next, the method 400 completes at block 410.

Figure 5:
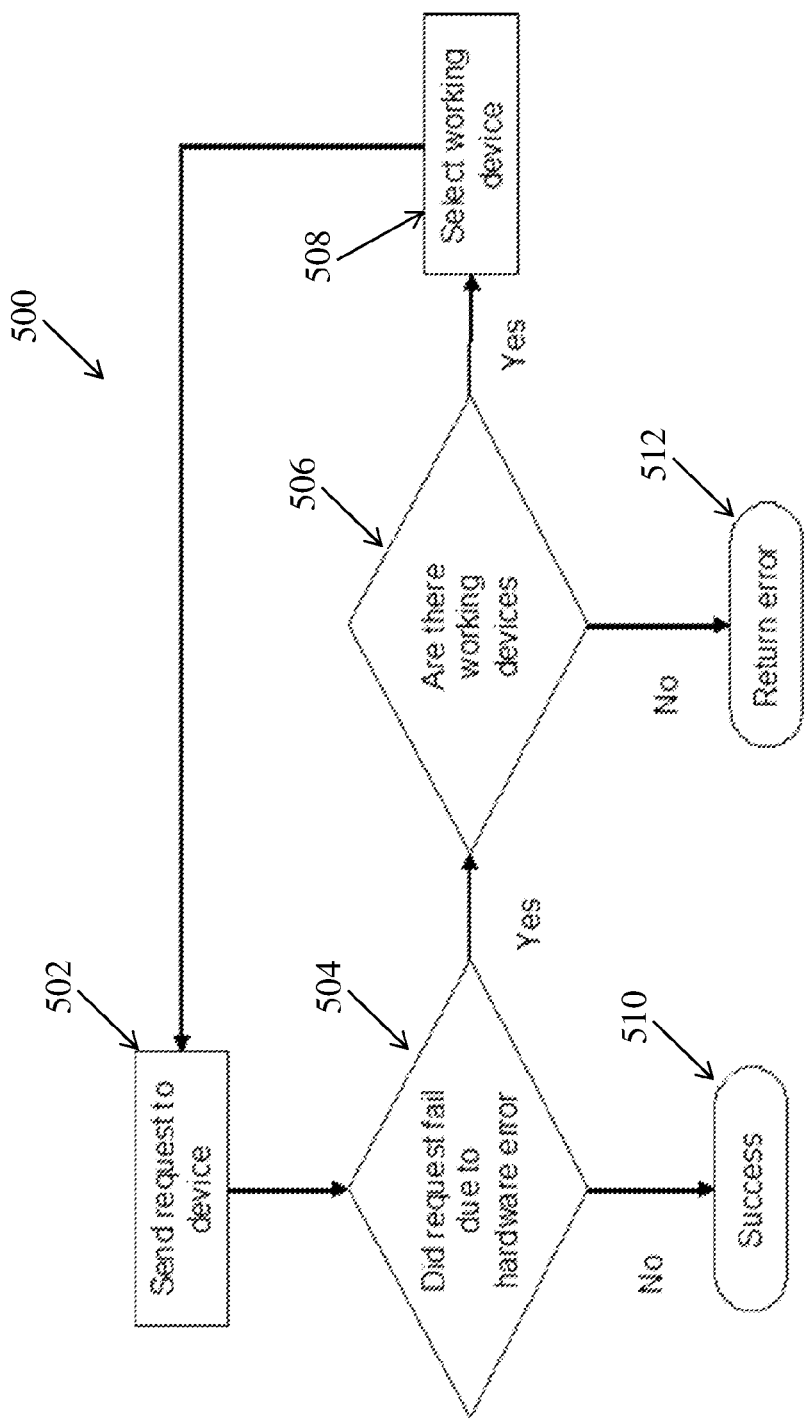
FIG. 5 illustrates a flow diagram of a method for fail-over processing across the one or more specialized hardware devices in accordance with an exemplary embodiment.

Referring now to FIG. 5, a flow diagram illustrating a method 500 for fail-over processing across the one or more specialized hardware devices in accordance with an exemplary embodiment. As illustrated, the method 500 begins at block 502 when a request is sent to a specialized hardware device. Next, as shown at decision block 504, the method 500 includes determining if the request failed due to an error of the specialized hardware device. If so, the method proceeds to decision block 506 and determines if there are other working specialized hardware devices available. If it is determined that there are other working specialized hardware devices available, the method 500 proceeds to block 508 and selects another working specialized hardware device. If the request does not fail due to an error of the specialized hardware device, the method 500 proceeds to block 510 and the successfully concludes. If there are no working specialized hardware devices available, the method 500 proceeds to block 512 and concludes by returning an error to the library API.

Figure 6:
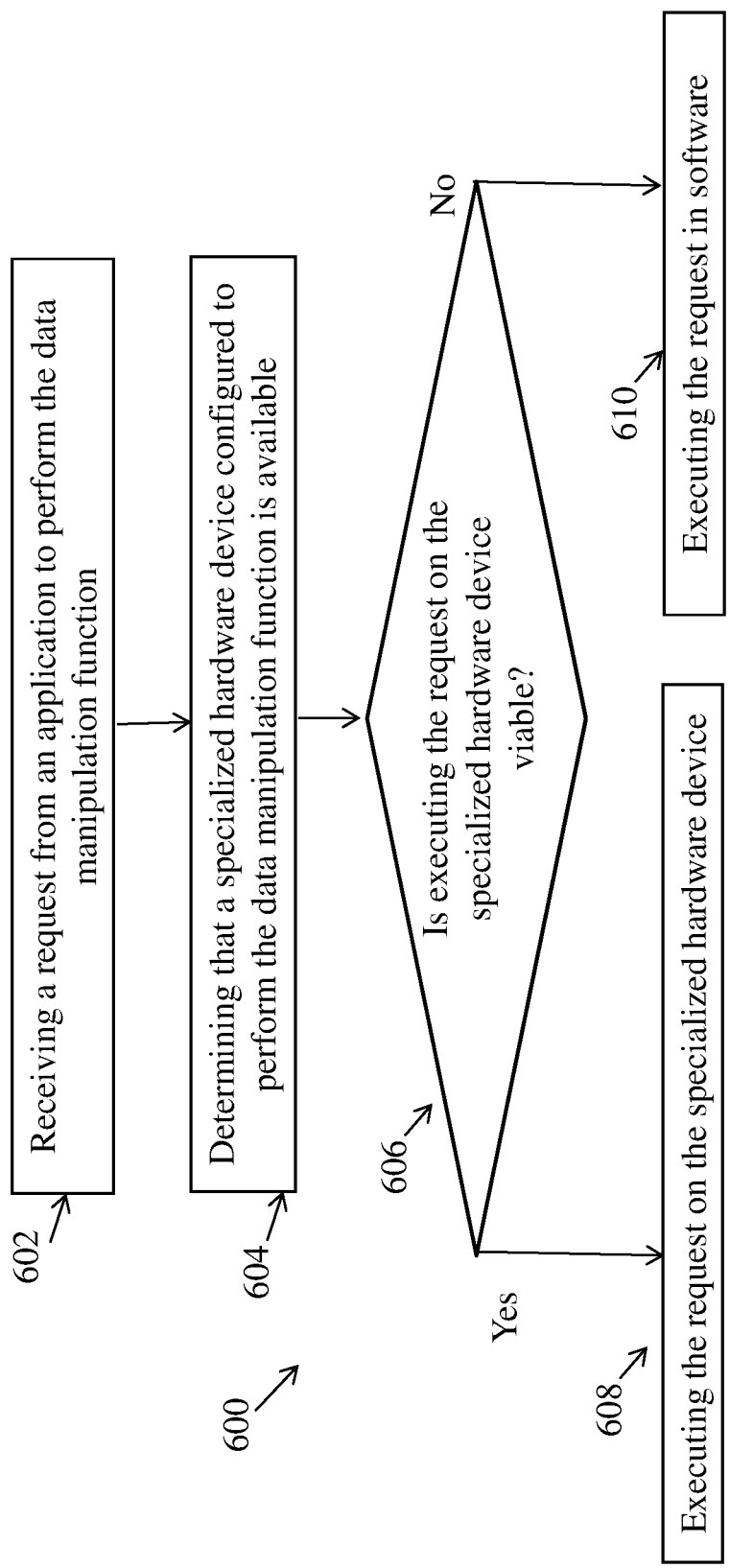
FIG. 6 illustrates a flow diagram of a method for performing a data manipulation function in accordance with an exemplary embodiment.

Referring now to FIG. 6, a flow diagram illustrating a method 600 for performing a data manipulation function. As shown at block 602, the method 600 includes receiving a request from an application to perform the data manipulation function. Next, as shown at block 604, the method 600 includes determining if a specialized hardware device configured to perform the data manipulation function is available. Next, as shown at decision block 606, the method 600 includes determining if the request is viable to execute on the specialized hardware device. If the request is viable to execute on the specialized hardware device, the method proceeds to block 608 and executes the request on the specialized hardware device. Otherwise, the method proceeds to block 610, and executes the request in software. In exemplary embodiments, determining if the request is viable to execute on the specialized hardware device includes determining if a size of data associated with the request is larger than a threshold size. In exemplary embodiments, the threshold size may be based on an overhead associated with using the specialized hardware device or may be determined by the application. In exemplary embodiments, executing the request on the specialized hardware device includes passing the request and data associated with the request to a software interface configured to communicate with the specialized hardware device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer system for performing a data manipulation function, the computer system comprising:
    an operating system comprising a software library, the software library having an algorithm configured to perform the data manipulation function;
    a specialized hardware device configured to perform the data manipulation function; and
    a processor configured to:
        receive a request from an application to perform the data manipulation function;
        based on determining that the specialized hardware device configured to perform the data manipulation function is available, determine if executing the request on the specialized hardware device is viable by determining if an overhead associated with sending the request to the specialized hardware device outweighs a cost of executing the request by executing the specialized hardware device algorithm configured to perform the data manipulation function stored in the software library, wherein determining if executing the request on the specialized hardware device is viable further comprises determining if a size of data associated with the request is larger than an adjustable threshold size for deciding between using the algorithm configured to perform the data manipulation function and the specialized hardware device, and wherein the adjustable threshold size is set by the algorithm configured to perform the data manipulation function and is used for determining if executing the request on the specialized hardware device is viable rather than using a threshold provided by the specialized hardware device;
        based on determining that executing the request on the specialized hardware device is viable, execute the request on the specialized hardware device; and
        based on determining that executing the request on the specialized hardware device is not viable, execute the request by executing the algorithm configured to perform the data manipulation function stored in the software library.

2. The computer system of claim 1, wherein the adjustable threshold size is based on the overhead associated with sending the request to the specialized hardware device.

3. The computer system of claim 1, wherein the adjustable threshold size is determined by the application.

4. The computer system of claim 1, wherein executing the request on the specialized hardware device comprises passing the request and data associated with the request to a software interface configured to communicate with the specialized hardware device, wherein the software includes an input buffer and an output buffer.

5. The computer system of claim 4, wherein the application includes an application input buffer and an application output buffer.

6. The computer system of claim 5, wherein the processor is further configured to use an overflow buffer to accommodate for a size difference between the application input buffer and the application output buffer and the input buffer and output buffer of the software interface.

7. A computer system for performing a data manipulation function, the computer system comprising:
    an operating system comprising a software library, the software library having an algorithm configured to perform the data manipulation function;
    a specialized hardware device configured to perform the data manipulation function; and
    a processor configured to:
        receive a request from an application to perform the data manipulation function;

based on determining that the specialized hardware device configured to perform the data manipulation function is available, determine if executing the request on the specialized hardware device is viable by determining if an overhead associated with sending the request to the specialized hardware device outweighs a cost of executing the request by executing the algorithm configured to perform the data manipulation function stored in the software library, wherein determining if executing the request on the specialized hardware device is viable further comprises determining if a size of data associated with the request is larger than an adjustable threshold size for deciding between using the algorithm configured to perform the data manipulation function and the specialized hardware device, wherein the adjustable threshold size is based on the overhead associated with sending the request to the specialized hardware device, and wherein the adjustable threshold size is set by the algorithm configured to perform the data manipulation function and is used for determining if executing the request on the specialized hardware device is viable rather than using a threshold provided by the specialized hardware device;

based on determining that executing the request on the specialized hardware device is viable, execute the request on the specialized hardware device; and based on determining that executing the request on the specialized hardware device is not viable, execute the request by executing the algorithm configured to perform the data manipulation function stored in the software library.

\* \* \* \* \*